US012228342B2

United States Patent
Turney et al.

(10) Patent No.: US 12,228,342 B2
(45) Date of Patent: Feb. 18, 2025

(54) ANNULAR ARRANGEMENT OF HEAT EXCHANGERS

(71) Applicant: Hamilton Sundstrand Corporation, Charlotte, NC (US)

(72) Inventors: Joseph E. Turney, Amston, CT (US); Robert H. Dold, Monson, MA (US); Kathryn L. Kirsch, East Haddam, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 220 days.

(21) Appl. No.: 17/947,337

(22) Filed: Sep. 19, 2022

(65) Prior Publication Data

US 2024/0093943 A1  Mar. 21, 2024

(51) Int. Cl.
*F28D 1/053* (2006.01)
*F02C 7/10* (2006.01)
*F28D 21/00* (2006.01)

(52) U.S. Cl.
CPC ............ *F28D 1/05366* (2013.01); *F02C 7/10* (2013.01); *F28D 21/00* (2013.01); *F05D 2260/213* (2013.01); *F28D 2021/0026* (2013.01)

(58) Field of Classification Search
CPC ......... F28D 1/05366; F28D 2021/0026; F28D 21/00; F02C 7/10; F05D 2260/213
USPC .......................................................... 165/81
See application file for complete search history.

(56) References Cited

U.S. PATENT DOCUMENTS

| 3,228,464 | A | 1/1966 | Stein et al. |
| 3,818,984 | A | 6/1974 | Nakamura et al. |
| 4,582,126 | A | 4/1986 | Corey |
| 4,993,223 | A | 2/1991 | Kretzinger |
| 5,004,044 | A | 4/1991 | Horgan et al. |
| 9,513,059 | B2 * | 12/2016 | Maurer ................. F28D 7/0058 |
| 9,771,867 | B2 * | 9/2017 | Karam .................. F28D 7/0058 |
| 10,094,286 | B2 | 10/2018 | Forcier |
| 10,550,767 | B2 * | 2/2020 | Eleftheriou ............... F02C 7/08 |
| 10,563,582 | B2 | 2/2020 | Duesler et al. |
| 10,883,773 | B2 | 1/2021 | Faber et al. |
| 11,378,009 | B2 * | 7/2022 | Roberge .................. F02K 3/115 |
| 11,881,320 | B2 * | 1/2024 | Wardle ..................... G21C 5/14 |
| 2012/0216544 | A1 | 8/2012 | Eleftheriou et al. |

(Continued)

OTHER PUBLICATIONS

European Search Report issued in European Application No. 23187638.4 dated Feb. 22, 2024.

*Primary Examiner* — Jon T. Schermerhorn, Jr.
(74) *Attorney, Agent, or Firm* — CANTOR COLBURN LLP

(57) ABSTRACT

A heat exchanger having: front and aft ends; heat exchanger cores in an annular loop that define circumferential gaps between adjacent pairs of the cores, the cores, individually or as axially aligned sets, extend from the front to aft ends and have facing inlet sides and circumferentially facing outlet sides configured such that the inlet sides and the outlet sides from the adjacent pairs of the cores face into the same circumferential gaps; and core guide vanes disposed in the circumferential gaps, the core guide vanes have an aft portion that extends from the front end to the aft end of the heat exchanger, wherein: at the front end the heat exchanger, the core guide vanes are closer to the outlet side of the cores; and at the aft end the heat exchanger, the core guide vanes are closer to the inlet sides of the cores.

7 Claims, 3 Drawing Sheets

(56) References Cited

U.S. PATENT DOCUMENTS

2016/0305324 A1   10/2016   Magowan
2021/0247152 A1    8/2021   Roberge
2022/0112817 A1    4/2022   Bradbrook et al.

* cited by examiner

ANNULAR ARRANGEMENT OF HEAT EXCHANGERS

STATEMENT OF FEDERAL SUPPORT

This invention was made with government support under Government Contract No. DE-AR0001342 awarded by the United States Department of Energy. The government has certain rights in the invention.

BACKGROUND

The embodiments relate to heat exchangers and more specifically to an annular arrangement of heat exchangers.

Gas turbine engines are configured to exhaust waste heat during normal operation. If a significant pressure drop is avoided, the waste heat may be recaptured and utilized for increasing the efficiency of the engine operation.

BRIEF SUMMARY

Disclosed is a heat exchanger including: a front end and an aft end spaced apart from each other; heat exchanger cores that are circumferentially spaced apart from each other in an annular loop such that they define circumferential gaps between adjacent pairs of the cores, wherein the cores, configured individually or in axially aligned sets, extend from the front end to the aft end and have circumferentially facing inlet sides and circumferentially facing outlet sides configured such that the inlet sides and the outlet sides from the adjacent pairs of the cores face into the same ones of the circumferential gaps; and core guide vanes disposed in the circumferential gaps, the core guide vanes have an aft portion that extends from the front end to the aft end of the heat exchanger, wherein: at the front end the heat exchanger, the core guide vanes are closer to the outlet side of the cores; and at the aft end the heat exchanger, the core guide vanes are closer to the inlet sides of the cores, whereby the core guide vanes are configured to turn a gas flow from an axial direction toward the inlet sides of the cores and from the outlet sides of the cores toward the axial direction.

In addition to one or more of the above disclosed aspects of the heat exchanger or as an alternate the cores are counter-flow or cross flow heat exchangers.

In addition to one or more of the above disclosed aspects of the heat exchanger or as an alternate the cores are rectangular shaped and have cases that include axial front surfaces; the core guide vanes each include a forward portion that extends forward from the aft portion; and the heat exchanger further includes: an annular inlet duct extending axially forward from the front end of the heat exchanger to a front end of the inlet duct, wherein the forward portion of the core guide vanes extends to the front end of the inlet duct; and duct guide vanes that extend axially forward from the inlet sides of the cores to an adjacent one of the core guide vanes, and connect over the axial front surfaces of the cores, to thereby form a flow path around the front surfaces of the cores.

In addition to one or more of the above disclosed aspects of the heat exchanger or as an alternate the heat exchanger has a first outer diameter, the inlet duct tapers toward the front end of the inlet duct to a second outer diameter that is smaller than the first outer diameter.

In addition to one or more of the above disclosed aspects of the heat exchanger or as an alternate the heat exchanger has a radial center; and the cases of the cores have radial outer surfaces located at the first outer diameter of the heat exchanger and radial inner surfaces that are spaced apart from the radial center of the heat exchanger, to thereby define a center flow passageway between the cores.

In addition to one or more of the above disclosed aspects of the heat exchanger or as an alternate the heat exchanger further includes: shroud sections extending between the cores, to define a radial flow boundary around the circumferential gaps.

Further disclosed is a gas turbine engine including: an engine inlet; an engine core located aft of the inlet; an exhaust duct located aft of the engine core; and a heat exchanger having one or more of the above disclosed aspects disposed between the engine core and the exhaust duct.

Further disclosed is a heat exchanger, including a front end and an aft end spaced apart from each other, and the heat exchanger defining radial center and outer diameter; heat exchanger cores extending from the front end to the aft end and are disposed in an annular loop, wherein the cores have inlet sides facing radially inward, toward the radial center of the heat exchanger and outlet sides facing radially outward, toward the outer diameter of the heat exchanger.

In addition to one or more of the above disclosed aspects of the heat exchanger or as an alternate the cores are counter-flow or cross flow heat exchangers.

In addition to one or more of the above disclosed aspects of the heat exchanger or as an alternate the cores are rectangular shaped.

In addition to one or more of the above disclosed aspects of the heat exchanger or as an alternate the heat exchanger further includes: shroud sections disposed radially exterior to the cores to define the outer diameter of the heat exchanger, the shroud sections being configured to turn a gas flow from a radial direction at the outlet sides of the cores to an axial direction.

In addition to one or more of the above disclosed aspects of the heat exchanger or as an alternate the inlet sides of the cores are spaced apart from the radial center of the heat exchanger to define a center flow passageway between the cores.

In addition to one or more of the above disclosed aspects of the heat exchanger or as an alternate the heat exchanger further includes: a guide plate located at the aft end of the heat exchanger and within the center flow passageway, the guide plate forming a V shape with a peak directed toward the front end of the heat exchanger, whereby the guide plate is configured to turn the gas flow from the axial direction to the radial direction and guide the gas flow to the inlet sides of the cores.

Further disclosed is a gas turbine engine including: an engine inlet; an engine core located aft of the inlet; an exhaust duct located aft of the engine core; and a heat exchanger having one or more of the above disclosed aspects disposed between the engine core and the exhaust duct.

BRIEF DESCRIPTION OF THE DRAWINGS

The present disclosure is illustrated by way of example and not limited in the accompanying figures in which like reference numerals indicate similar elements.

DETAILED DESCRIPTION

The embodiments disclose herein are directed to a configuration of a heat exchanger. The arrangement of the embodiments utilize an annular compact packaging configuration for the heat exchangers that provides a large flow-facing surface area, reducing pressure losses. The heat exchanger can be used with any heat producing device. For example, it can be used in an exhaust of an aircraft engine. In one embodiment, when used with a turbofan engine, for example, it can improve efficiency by harvesting waste heat from the exhaust stream while providing a low pressure drop.

Figure 1:
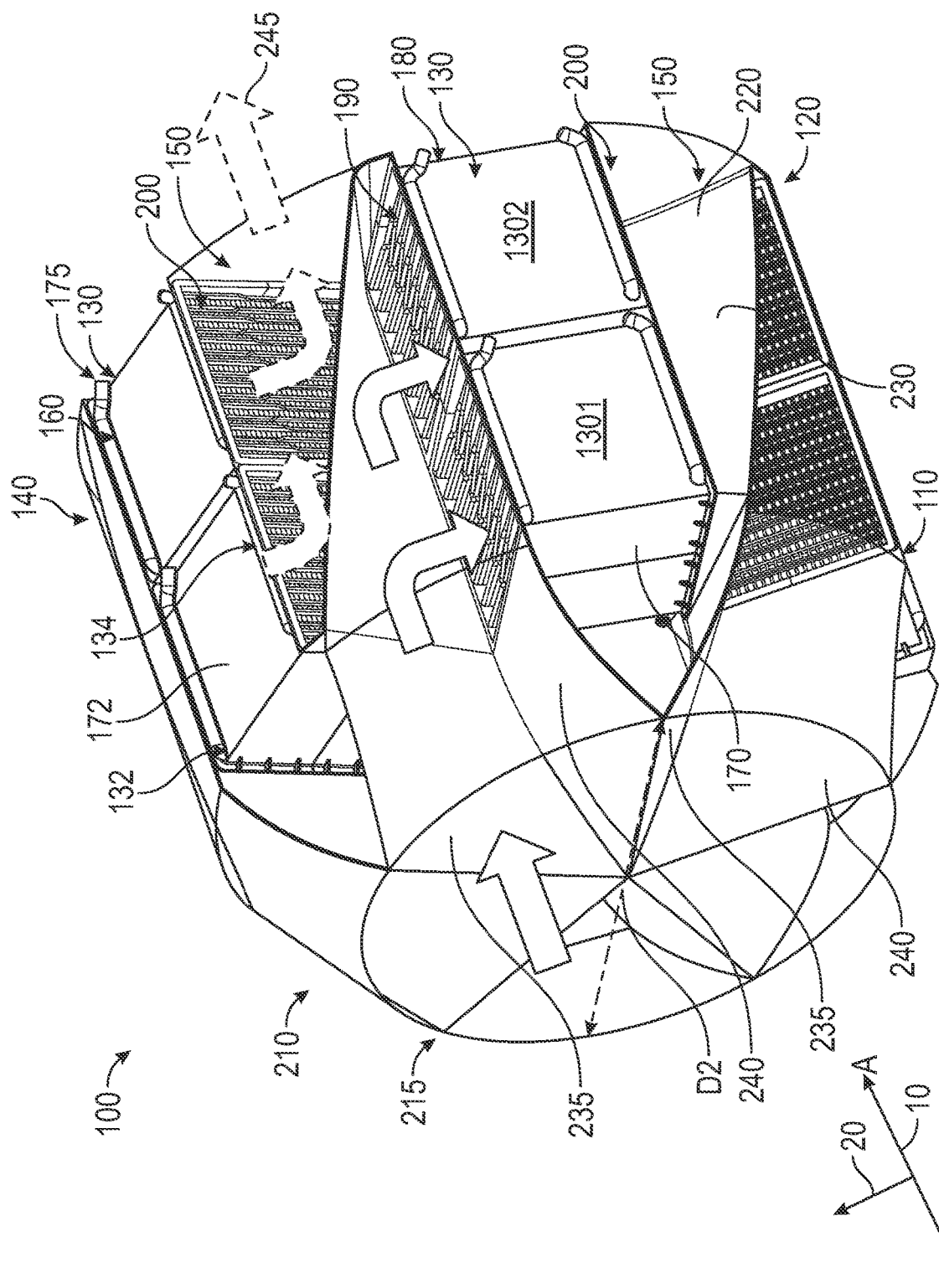
FIG. 1 shows a heat exchanger according to a disclosed embodiment.

Turning to FIG. 1, a heat exchanger 100 is shown. The heat exchanger 100 includes a front end 110 and an aft end 120 spaced apart from each other. Flow (e.g., the arrows in FIG. 1) moves from the front end 110 to the aft end 120. The heat exchanger 100 includes heat exchanger cores 130 circumferentially spaced apart from each other in an annular loop 140 such that they define circumferential gaps 150 between adjacent pairs of the cores 130. The cores 130 are counter-flow heat exchangers that are rectangular shaped and have cases 160 that include axial front surfaces 170 and axial aft surfaces 180. Cross flow heat exchangers are within the scope of the embodiments. The cores 130 are arranged in pairs 1301, 1302, in the forward F to aft A direction, e.g., relative to the axial direction 10 as show in FIG. 1, though this is not intended on limiting the scope of the core arrangements. The cores 130 have inlet and outlet headers 132, 134 on radially exterior sides 172, e.g., relative to the radial direction 20 in a non-limiting embodiment. Fluid flow 175 through the core via the headers is used to recapture waste heat from an engine flow.

The cores 130, configured as axially aligned in sets or pairs 1301, 1302 extend from the front end 110 to the aft end 120. Each core 130 has a circumferentially facing inlet side 190 and a circumferentially facing outlet side 200. Within the circumferential gaps 150, the inlet sides 190 and the outlet sides 200 from the adjacent pairs of the cores 130 face into the same ones of the circumferential gaps 150, e.g., they are juxtaposed.

Figure 2:
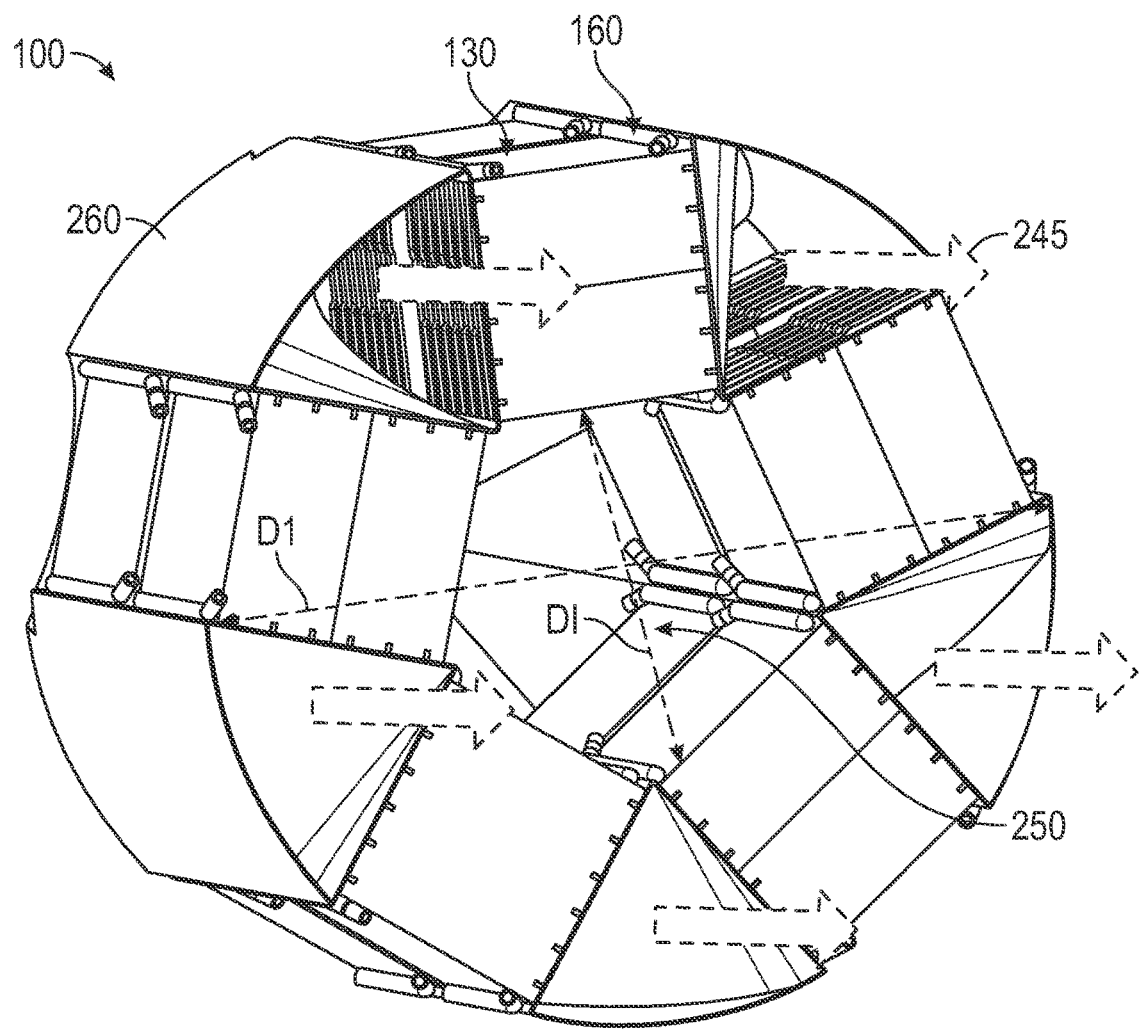
FIG. 2 is an aft view of the heat exchanger of FIG. 1.

An annular inlet duct 210 extends axially forward from the front end 110 of the heat exchanger 100 to a front end 215 of the inlet duct 210. The heat exchanger 100 has a first outer diameter D1 (FIG. 2). The inlet duct 210 tapers toward the front end 215 of the inlet duct 210 to a second outer diameter D2 that is smaller than the first outer diameter D1.

Core guide vanes 220, which can be implemented as smooth or tapered walls, are disposed in the circumferential gaps 150. The core guide vanes 220 include an aft portion 230 that extends from the aft end 120 of the heat exchanger 100 to the front end 110 of the heat exchanger 100. A forward portion 235 of the core guide vanes 220 extends from the front end 110 of the heat exchanger 100 to the front end 215 of the inlet duct 210.

At the front end 110 of the heat exchanger 100, the core guide vanes 220 are closer to the outlet side 200 of the cores 130. At the aft end 120 the heat exchanger 100, the core guide vanes 220 are closer to the inlet sides 190 of the cores 130. From this configuration, the core guide vanes 220 are configured to turn a flow 245 from an axial direction toward the inlet sides 190 of the cores 130 and from the outlet sides 200 of the cores 130 toward the axial direction.

Duct guide vanes 240 extend axially forward from the inlet sides 190 of the cores 130 to an adjacent one of the core guide vanes 220, e.g., to the forward portion 235 of the core guide vanes 220. The duct guide vanes 240 connect over the axial front surfaces 170 of the cores 130. This configuration forms a flow path around the front surfaces 170 of the cores 130.

As shown in FIG. 2, a center flow passageway 250 is defined between the cores 130. Specifically, the heat exchanger 100 has a radial center RC. The cases 160 of the cores 130 have radial outer surfaces RO located at the first outer diameter D1 of the heat exchanger 100 and radial inner surfaces RI that are spaced apart from the radial center RO of the heat exchanger 100. The center flow passageway 250 is defined by the radial inner surfaces RI of the cores 130. That is, an inner diameter DI of the heat exchanger 100 formed by the radially inner facing surfaces of the cores 130 defines the diameter of the center flow passageway 250. Shroud sections 260 extend between the cores 130. The shroud sections 260 define a radial flow boundary for the gas flow 245 around the circumferential gaps 150. In the illustrated embodiment, there is no air-flow through the center region. However in certain embodiments, a bypass flow could be provided though the center region rather than sending the entirety of the airflow through the cores.

Figure 3:
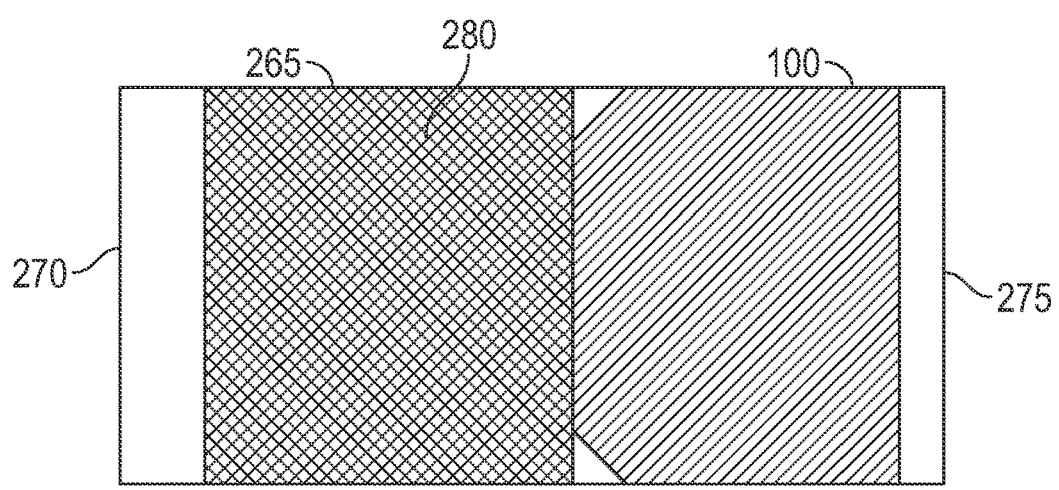
FIG. 3 shows an engine that includes the heat exchanger of FIG. 1.

Turning to FIG. 3, a gas turbine engine 265 is shown. The engine 265 has an engine inlet 270, an engine core 280 located aft of the engine inlet 270 and an exhaust duct 275 located aft of the engine core 280. The heat exchanger 100 is disposed between the engine core 280 and the exhaust duct 275 in one embodiment.

With the above embodiments, rectangular heat exchanger cores 130 are packaged in an annular loop configuration. Exhaust flow enters axially, turns approximately ninety degrees to circumferentially flow through the heat exchanger cores 130, then turns back in to substantially the original flow direction to continue axially. Space or gaps 150 between the heat exchanger cores 130 is utilized to duct the flow into and out of the heat exchangers. Core guide vanes 220 between adjacent heat exchanger cores 130 helps to provide uniform flow to the heat exchanger cores 130.

Figure 4:
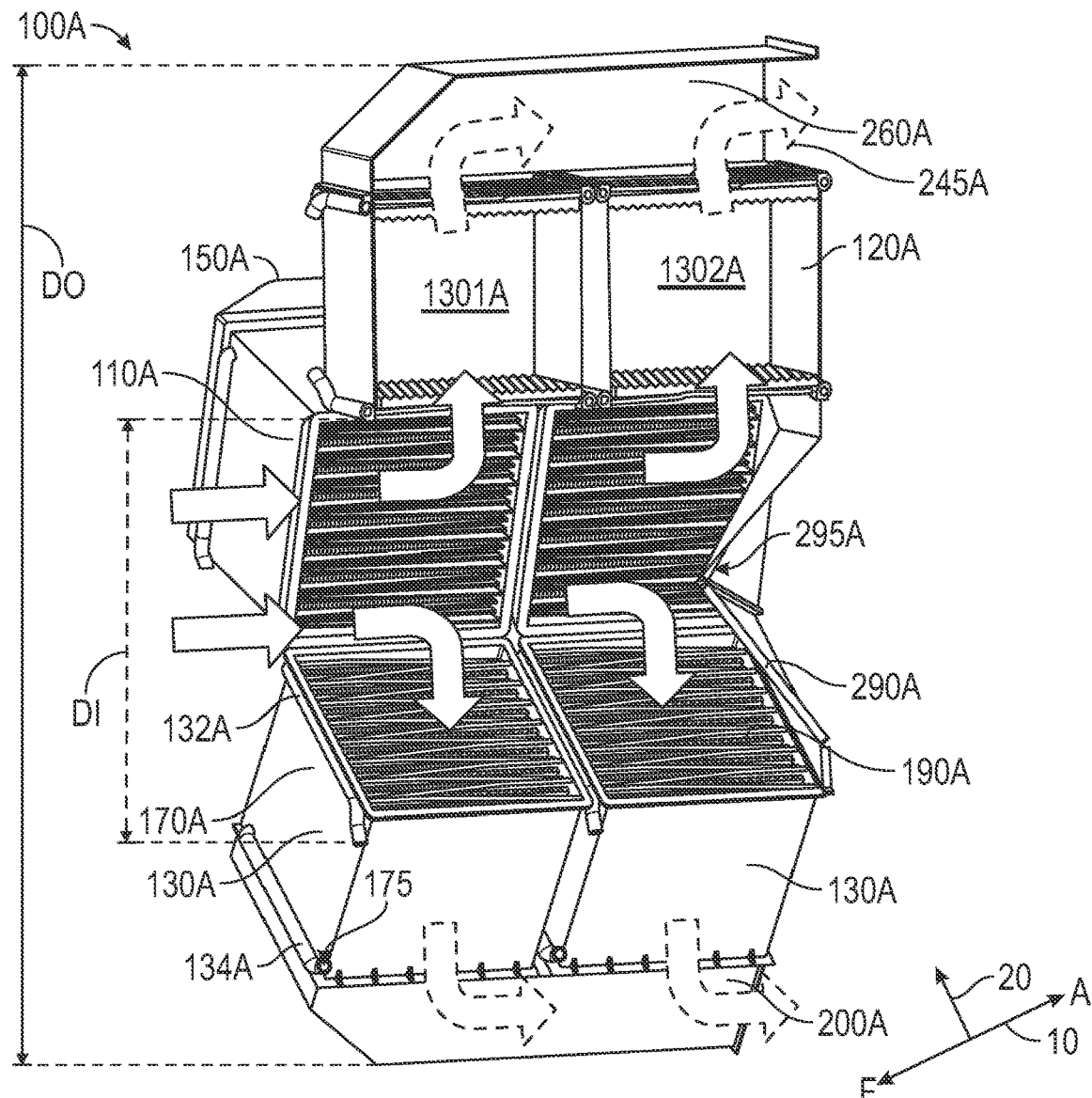
FIG. 4 shows a heat exchanger according to another disclosed embodiment.

Turning to FIG. 4, another embodiment of the heat exchanger 100A is shown. The heat exchanger 100A includes a front end 110A and an aft end 120A spaced apart from each other. The heat exchanger 100A defines radial center RC and an outer diameter DO. Heat exchanger cores 130A, configured as axially aligned in sets or pairs 1301A, 1302A extend from the front end 110A to the aft end 120A and are disposed in an annular loop 140A. The cores 130A have inlet and outlet headers 132A, 134A on axial exterior walls, such as the axial front surface 170A, in a non-limiting embodiment. Flow (e.g., the arrows in FIG. 4) moves from the front end 110A to the aft end 120A. Fluid 175 through the core via the headers is used to recapture waste heat from an engine flow.

The cores 130A are arranged in pairs 1301A, 1302A, in the forward F to aft A direction, e.g., relative to axial direction 10, though this is not intended on limiting the scope of the core arrangements. The cores 130A each have an inlet side 190A facing radially inward, relative to the radial direction 20, toward the radial center RC of the heat exchanger 100A and an outlet side 200A facing radially outward, toward the outer diameter DO of the heat exchanger 100A. The cores 130A are circumferentially spaced apart from each other to define circumferential gaps 150A between adjacent pairs of cores 130A.

A center flow passageway 250A is defined between the cores 130A. Specifically, the inlet sides 190A of the cores 130A are spaced apart from the radial center RC of the heat exchanger 100A to define a radial inner surface RI of the heat exchanger 100A. This spacing defines the center flow passageway 250A. That is, an inner diameter DI of the heat exchanger 100A formed by the radially inner facing surfaces of the cores 130A defines the diameter of the center flow passageway 250A.

A guide plate 290A is located at the aft end 120A of the heat exchanger 100A and within the center flow passageway 250A. The guide plate 290A forms a V-shape with a peak 295A of the shape directed toward the front end 110A of the heat exchanger 100A. From this configuration, the guide plate 290A is configured to turn the flow 245A from the axial direction to the radial direction and guide the flow 245A to the inlet sides 190A of the cores 130A.

Shroud sections 260A are disposed radially exterior to the cores 130A, and are spaced apart from the gaps 150A to not enclose the gaps 150A in this embodiment, and define the outer diameter DO of the heat exchanger 100A. The shroud sections 260A are partially cup-shaped to form an outer boundary or guide that is configured to turn a flow 245A from a radial direction at the outlet sides of the cores 130A to an axial direction.

Figure 5:
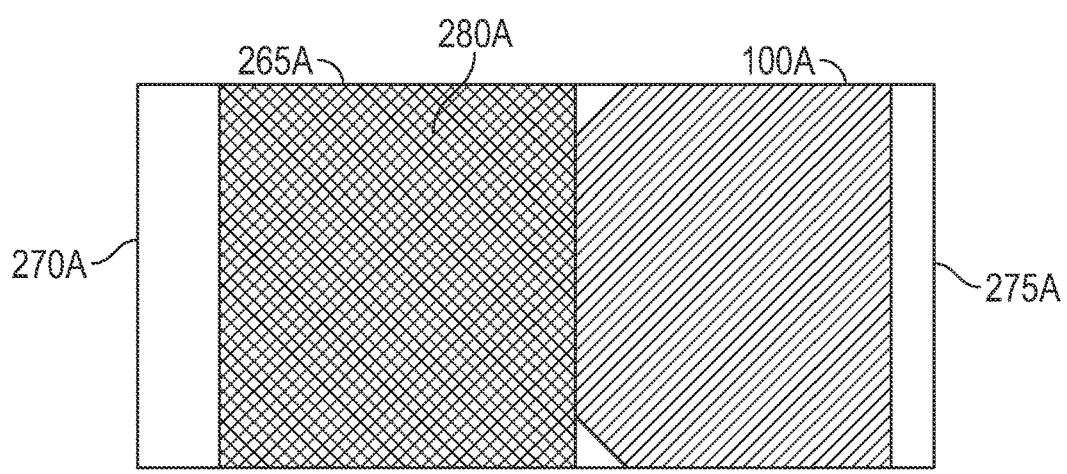
FIG. 5 shows an engine that includes the heat exchanger of FIG. 4.

As shown in FIG. 5, a gas turbine engine 265A includes an engine inlet 270A, an engine core 280A located aft of the engine inlet 270A, and an exhaust duct 275A located aft of the engine core 280A. The heat exchanger 100A shown in FIG. 4 is disposed between the engine core 280A and the exhaust duct 275A in one embodiment.

In the configuration of FIGS. 4 and 5, the faces of the cores 130A are directed toward the inner and outer diameters DI, DO of the heat exchanger configuration. The exhaust flow 245A in this configuration flows radially through the heat exchanger cores 130A.

These embodiments provide packaging configuration for heat exchangers 100, 100A in the exhaust stream of an engine 265, 265A that is applicable to a typical form factor of the engine while providing sufficient face area for the heat exchanger cores 130, 130A. The heat exchanger cores 130, 130A can be rectilinear. The concept may be modular in that more or fewer heat exchanger cores 130, 130A can be added as necessary to capture sufficient heat.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed:

1. A heat exchanger comprising:
   a front end and an aft end spaced apart from each other;
   heat exchanger cores that are circumferentially spaced apart from each other in an annular loop such that they define circumferential gaps between adjacent pairs of the cores;
   wherein the cores, configured individually or as axially aligned sets, extend from the front end to the aft end and have circumferentially facing inlet sides and circumferentially facing outlet sides configured such that the inlet sides and the outlet sides from the adjacent pairs of the cores face into the same ones of the circumferential gaps; and
   core guide vanes disposed in the circumferential gaps;
   the core guide vanes have an aft portion that extends from the front end to the aft end of the heat exchanger;
   wherein: at the front end of the heat exchanger, the core guide vanes are closer to the outlet side of the cores; and at the aft end the heat exchanger, the core guide vanes are closer to the inlet sides of the cores;
   whereby the core guide vanes are configured to turn a gas flow from an axial direction toward the inlet sides of the cores and from the outlet sides of the cores toward the axial direction.

2. The heat exchanger of claim 1, wherein:
   the cores are counter-flow or cross flow heat exchangers.

3. The heat exchanger of claim 1, wherein:
   the cores are rectangular shaped and have cases that include axial front surfaces;
   the core guide vanes each include a forward portion that extends forward from the aft portion; and
   the heat exchanger further comprises:
      an annular inlet duct extending axially forward from the front end of the heat exchanger to a front end of the inlet duct, wherein the forward portion of the core guide vanes extends to the front end of the inlet duct; and
      duct guide vanes that extend axially forward from the inlet sides of the cores to an adjacent one of the core guide vanes, and connect over the axial front surfaces of the cores, to thereby form a flow path around the front surfaces of the cores.

4. The heat exchanger of claim 3, wherein the heat exchanger has a first outer diameter, the inlet duct tapers toward the front end of the inlet duct to a second outer diameter that is smaller than the first outer diameter.

5. The heat exchanger of claim 4, wherein:
   the heat exchanger has a radial center; and
   the cases of the cores have radial outer surfaces located at the first outer diameter of the heat exchanger and radial inner surfaces that are spaced apart from the radial center of the heat exchanger, to thereby define a center flow passageway between the cores.

6. The heat exchanger of claim 1, further comprising:
   shroud sections extending between the cores, to define a radial flow boundary around the circumferential gaps.

7. A gas turbine engine comprising:
   an engine inlet;
   an engine core located aft of the inlet;
   an exhaust duct located aft of the engine core; and the heat exchanger of claim 1 disposed between the engine core and the exhaust duct.

* * * * *